Sept. 7, 1937.  L. H. JONES  2,091,993

FERTILIZATION OF PLANTS

Filed July 7, 1933

Inventor
Linus H. Jones,
By W. Bartlett Jones, Atty.

Witness:
Chas. R. Koursh

Patented Sept. 7, 1937

2,091,993

UNITED STATES PATENT OFFICE 2,091,993

FERTILIZATION OF PLANTS

Linus H. Jones, Amherst, Mass., assignor to W. Bartlett Jones, Chicago, Ill.

Application July 7, 1933, Serial No. 679,280

5 Claims. (Cl. 71—64)

The present invention relates to the fertilization of plants, to fertilizers and in particular to a fertilizer unit most useful for potted plants, especially in homes, greenhouses, and the like.

Among the objects of the invention is the provision of a unit for containing fertilizers, especially bad smelling fertilizers, for preventing obnoxious odors in handling the fertilizer, for facilitating application of the fertilizer, for preventing odor from the dirt or earth after application of the fertilizer, and for controlling the dosage of applied fertilizer.

Another object of the invention is the provision of a fertilizer unit containing an organic nitrogen compound, or nitrogen and phosphorus, which is more slowly made available to a plant than inorganic salts containing nitrogen.

Heretofore, plant fertilizers in unit form have been made largely of quickly soluble inorganic chemicals providing nitrogen, phosphorus and potassium. These become available too quickly and are likely to produce injury rather than permanent benefit to the plant. The injury may be in burning the roots, by a heavy local concentration. Another form of injury is the provision of a food impetus, stimulating a quick growth, after which the new food is exhausted, and the remaining nutriment in the earth is insufficient to maintain the new forced growth. The nitrogen supply is most pertinent to this form of injury.

In the present invention the nitrogen supply is in whole or in part provided in a form which is subject to progressive decay in order to become available. I may use organic fertilizers such as tankage, sewage sludge cake, gelatin, glue, dried blood, cotton seed meal, fish meal and the like. Among these fish meal is one which is also rich in phosphorus, and this likewise becomes slowly available. The materials given are likely to have disagreeable odors, and when used in the present invention the benefits are available regardless of the odor. Although the invention may be used with any solid or semi-solid fertilizer material, or compounded mixture of several materials, it will be described with particular reference to fish meal.

Fish meal is a very desirable fertilizer material, but its use is limited more by its odor than by its other properties. When applied as most fertilizers are applied by spreading a quantity of it on the earth about a plant, its odor is so obnoxious that it is not used where it could otherwise be used with great economic value. This is especially true in greenhouses, homes, and flower shops where the plant is confined within building structures.

The present invention provides a simple unit which is advantageous for containing fish meal, so that it may be sold in small quantities, or in small packages, so that it may be kept in a store stock for such sale, so that it can be easily used about plants, and thereafter be effective,— all without any disadvantage from its odor.

In carrying out the invention the fertilizer is housed in a substantially sealed container which is of material capable of disintegration or change when buried in moist earth, to release the fertilizer for use without exposure of it for emitting obnoxious odors. The container may be some water absorbent substance, such as regenerated cellulose, a starch film, or a gelatin body. Derivatives of starch and cellulose, such as certain of the hydroxy alphyl ethers, which are water soluble may also be used. I prefer to use a gelatin body because the gelatin itself has fertilizer value, and because it can be readily obtained in a form or unit which is particularly adapted for the present invention.

The form of the unit for containing the fertilizer may be varied over a wide range. It may be in a flexible form, or a rigid form, flat, round, or otherwise shaped. I prefer a rigid capsule of gelatin, which unit is an article of commerce made in many useful sizes. Such capsule may be filled readily, like medicinal capsules are prepared, for which purpose machines are already in use.

An envelope of film material may be filled with fertilizer and sealed. Regenerated cellulose in envelope form is also available now on the market, and machines for making and filling them are also in use. Of course a gelatin sheet, or other suitable film material may be made in envelope form.

Another form for the invention is the compression of the fertilizer into a tablet, rod, or other form, and thereafter coating the form with a protective film of suitable material. A compress in pellet or rod form may be dipped into a viscous hot gelatin solution and dried. Such forms may be coated with sugar powders, or starch powders, by the same process, and with the same materials that are used for coating medicinal tablets. Preferably, tablets of predetermined size are made by compression, which are coated with an agent by rolling them in a drum containing the coating material, using the same apparatus now employed for coating medicinal tablests.

In the accompanying drawing numerous forms of the invention are shown in order to illustrate and explain the nature of the invention.

In explaining the nature of the fertilizer it is to be understood that any kind or mixture may be used. As an example of a bad smelling fertilizer which is balanced by adding another kind, the following material has been found very efficient.

| | Parts |
|---|---|
| Fish meal | 9 |
| Potassium nitrate | 1 |

The formula given provides fertilizer which is balanced in the three important elements: nitrogen, potassium and phosphorus. This may be formed into a dry powder mixture which flows freely for convenience in use. For filling units it is preferably dry. For compression purposes it may be moistened with water, or water and gum, but this is not essential. The unit form is highly advantageous for fertilizers which take up moisture and cake.

Figure 1:
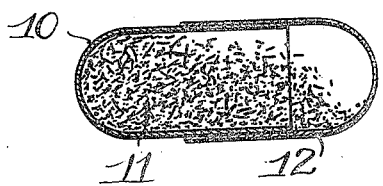
Fig. 1 represents a preformed round capsule filled with fertilizer.
Figure 5:
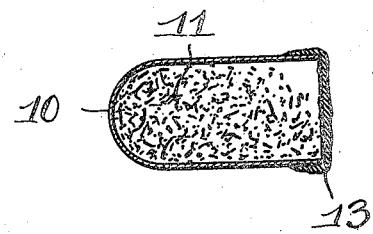
Fig. 5 represents a preformed shell, afterwards filled, and then sealed with a coating.

In Fig. 1 a capsule body 10 is filled with fertilizer 11. This may be sealed into a unit by fitting onto it the companion top 12 of the capsule. The seal ordinarily is quite tight, but it may be made more perfect by spotting the capsule with water, or a jet of steam, as the cap is about to be applied. In place of so capping it, the top may be sealed by applying a coating substance, such as a hot gelatin solution, and drying to form a film cover 13 as shown in Fig. 5.

Figure 2:
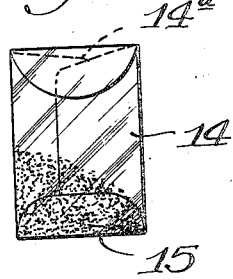
Fig. 2 represents a preformed flat envelope containing fertilizer.

Fig. 2 represents an envelope 14 of suitable film material as described which is simply filled with fertilizer 15, and sealed as at 14a.

Figure 3:
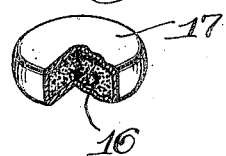
Fig. 3 represents a preformed tablet form or pellet of fertilizer afterwards coated.

Fig. 3 represents a tablet at 16 made by compression in a mould, which may be dipped or coated in one of the several ways described, to form a coating 17 of powder or of colloid material.

Figure 4:
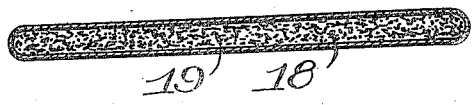
Fig. 4 represents a preformed rod-form of fertilizer afterwards coated.

Fig. 4 is similar to Fig. 3, but has a rod-form of compressed fertilizer 18 which is coated at 19, as described for the tablet of Fig. 3.

The forms of Figs. 1, 3, 4 and 5 may be easily applied by punching a hole in the dirt or earth, as with a pencil or like form, and then dropping the unit into the hole. When covered the application is complete. The envelope form of Fig. 2 is not so readily applied, but may be used conveniently by leaving it in the earth when transplanting or repotting plants.

The diffusion and absorption of the fertilizer is slow as the coating disintegrates, and the release of odors is slow so that it is absorbed or adsorbed by the soil and consumed by the roots of the plant under such conditions that there is no obnoxious escape from the soil.

The control of the composition and the quantity of it in the unit may be varied for different plants. I have used capsule units of the 00 size containing the fertilizer compound above described for in-door plants, such as geranium, coleus, fuchsia, primrose, begonia and others, in the following way: 1 capsule for a 3 inch pot, 2 capsules for a 4 inch pot, and 3 capsules for a 5 inch pot, at substantially monthly intervals, with no perceptible odor. On using the invention as above described for four to five months plants have shown a 500% to 3600% improvement on a weighted measurement of the increase in flowers, stalks of flowers and number of leaves, over the condition of test plants not treated with fertilizer.

In using a gelatin capsule as a container its fertilizer value is added to the contents. A standard gelatin capsule of size 00 weighs on the average 0.13 gram, and the average weight of the above given formula of fish meal and potassium nitrate, in such a capsule is about 0.60 gram.

A particular advantage of the invention is the use of a quickly available fertilizer and a slowly available fertilizer, and an absorption-retarding container for the quickly available component, such as the potassium nitrate. The gelatin of the capsule permits a delayed distribution of the potassium nitrate, which is quickly effective to give a growth impetus. The following decomposition of the fish meal gradually provides the nourishment which the new growth requires. The periodic addition of more such units is preferably timed to maintain the supply of nourishment, and the slow release maintains the supply between the fertilizing periods.

The fish meal is representative of decomposable matter containing latent fertilizer value. In order to initiate decomposition there must be present the proper bacteria. These are ever present in the earth. However, in order to speed up the decomposition a local strong colony of bacteria is desirable. This is readily built up because of the presence of quickly available nitrogen which is necessary in the life cycle of the bacteria. The soluble potassium nitrate provides this. The gelatin capsule also contributes a share to the formation of a colony to act on the fish meal. The capsule when inserted is dry. This soon absorbs moisture and softens, and is at the same time attacked by bacteria. This action liquefies the gelatin. The nitrate on the interior is available to cause the quicker growth of the bacteria as it acts on the nutrient gelatin, and then this strong colony attacks the fish meal. Beneath the surface of the dirt the decomposition of the fish meal produces very foul odors, but the depth of the locus of the fish meal in combination with absorbing and converting action of roots and the dirt prevents the odor being detected above the surface of the dirt. If the capsule or cover is of material other than gelatin, the nitrate will still function quickly to build up a colony, but of course not so quickly unless the covering material is a nutrient for the bacteria.

The invention affords a simple means and method for maintaining plants in full vigor without repotting. It is particularly convenient for home plants which are generally neglected in the matter of nutrition. The ease of application, the predetermined dosage, the balanced form of fertilizer, and the permanence of the unit, all contribute to the advantages of the invention.

Matter disclosed herein and not claimed is further described and claimed in my copending applications Serial No. 28,760, filed June 27, 1935, and Serial No. 133,379, filed March 27, 1937.

In the accompanying claims I aim to express the invention both as a method of fertilizing plants and also as a means therefor and as a method of making such means.

I claim:

1. A fertilizer unit for plants comprising a gelatin capsule, and fish meal housed in said capsule.

2. The method of fertilizing plants in an inoffensive manner with fish meal, which comprises housing the fish meal in a gelatin container, and then burying the said container in the earth about the plant.

3. A fertilizer unit for plants comprising insoluble putrescible organic nitrogenous material which is capable of slow decomposition in moist earth to release and render available to a plant its latent fertilizer value, and a gelatine-containing envelope enclosing said material.

4. The method of fertilizing a plant which comprises housing insoluble putrescible organic nitrogenous material which is capable of slow decomposition in moist earth to release and render available to a plant its latent fertilizer value, in a container of gelatin-base, and burying the said container in the earth about the plant.

5. A fertilizer unit for plants comprising a gelatin-base envelope, and fish meal housed in said envelope.

LINUS H. JONES.